(12) United States Patent
Lewin et al.

(10) Patent No.: US 6,633,216 B2
(45) Date of Patent: Oct. 14, 2003

(54) SELF-LOCATING COIL ASSEMBLY

(75) Inventors: Douglas Lewin, Cement City, MI (US); Paolo Rea, Dearborn, MI (US); David E. Collins, Dearborn, MI (US)

(73) Assignee: Kelsey-Hayes Company, Livonia, MI (US)

( * ) Notice: Subject to any disclaimer, the term of this patent is extended or adjusted under 35 U.S.C. 154(b) by 172 days.

(21) Appl. No.: 09/760,075

(22) Filed: Jan. 12, 2001

(65) Prior Publication Data

US 2002/0093411 A1 Jul. 18, 2002

(51) Int. Cl.[7] ................................................. H01F 7/08
(52) U.S. Cl. ........................ 335/220; 336/198; 335/278
(58) Field of Search ................... 335/256–78, 220–229; 251/129.15, 129.01, 129.16–129.21; 336/192, 198, 196

(56) References Cited

U.S. PATENT DOCUMENTS

| 3,497,845 | A | 2/1970 | Bernier |
| 3,730,146 | A | 5/1973 | Moulds et al. |
| 3,859,614 | A | 1/1975 | Reithmaier |
| 4,186,363 | A | 1/1980 | Schmidt, Jr. et al. |
| 4,439,751 | A | 3/1984 | Gibas |
| 4,728,916 | A | 3/1988 | Fontecchio et al. |
| 5,198,790 | A | 3/1993 | Elow |
| 5,533,249 | A | 7/1996 | Wakeman |
| 5,563,756 | A | * 10/1996 | Ignasiak ...................... 363/42 |
| 5,601,275 | A | 2/1997 | Hironaka |
| 6,065,734 | A | 5/2000 | Tackett et al. |
| 6,086,042 | A | 7/2000 | Scott et al. |
| 6,142,445 | A | 11/2000 | Kawaguchi et al. |

FOREIGN PATENT DOCUMENTS

| FR | 1515330 | 3/1968 |
| JP | 58-46283 | * 3/1983 |

* cited by examiner

Primary Examiner—Lincoln Donovan
(74) Attorney, Agent, or Firm—MacMillan, Sobanski & Todd, LLC

(57) ABSTRACT

A coil assembly comprises a coil wound upon a bobbin. A pair of terminals is supported by the bobbin. The coil has a pair of lead wires, each of which is connected to one of the terminals. Each terminal is adapted to be coupled to an electronic control unit. The coil is enclosed at least in part by a flux return casing. At least one resilient member is arranged and configured to urge the bobbin and the casing axially downward.

20 Claims, 4 Drawing Sheets

SELF-LOCATING COIL ASSEMBLY

BACKGROUND OF THE INVENTION

This invention relates in general to a coil assembly and more particularly to a coil assembly that fits snuggly about a valve cartridge armature and that encounters minimal axial translation due to manufacturing tolerances.

Coil assemblies are well known. A conventional coil assembly includes a coil in the form of an insulated magnet wire wound on an insulated bobbin. The bobbin supports a pair of terminals. Lead wires of the magnet wire are wound upon the terminals. The terminals may be connected to a current source. Current passing through the magnet wire produces magnetic flux.

Conventional coil assemblies are typically used as control devices. For example, conventional coil assemblies may be used to control valves. Valves controlled by coil assemblies include an axially shiftable armature. The armature is biased by spring to maintain a valve ball in a normally opened or closed position. The valve ball is adapted to cooperate with a valve seat member, which is provided in a valve body. The armature typically slides within a valve sleeve. The coil assembly is carried by the valve sleeve.

Coil assemblies for controlling valves like the valve described above are typically enclosed by a flux return casing. An annular flux ring is often disposed within an open end of the bobbin. The annular flux ring is adapted to engage the flux return casing to complete a magnetic flux path that is adapted to pass through the armature and the valve seat member.

To actuate the valve, electric current is supplied through the terminals to the coil. The current establishes a magnetic field in the armature, which pulls the armature against the force of the spring to open or close the valve ball. An interruption in the current causes the magnetic field to collapse. This allows the spring to return the armature to its normal position.

To insure proper operation of the valve, the armature and sleeve must fit within a close tolerance of the bobbin. The bobbin must fit within a close tolerance of the flux return casing. Moreover, the annular flux ring, the flux return casing, the armature, and the valve seat member must make sufficient contact with one another.

A plurality of valves is often supported by a hydraulic control unit. Each of the valves is controlled by a separate coil assembly. The coil assemblies are typically controlled by an electronic control unit. The electronic control unit is often coupled to the coil assemblies via a lead frame or multi-chip module that is adapted to support a plurality of coil assemblies. The lead frame or multi-chip module would include a pair of holes for receiving the terminals of each coil assembly.

A problem exists with positioning the coil assemblies relative to respective valves do to manufacturing tolerances. For example, the terminals of a plurality of coil assemblies are connected to a lead frame or a multi-chip module. A plurality of valves is supported by a hydraulic control unit. Each of the coil assemblies, though connected to the lead frame or multi-chip module, must align with a corresponding valve sleeve. This often requires that a certain amount of slop exist between the coil assembly bobbins and the valve sleeves as a result of manufacturing tolerances. The slop reduces the magnetic field established in the armature. In addition, an inability to control the position of the flux return casings relative to their respective valve seats may result in insufficient contact between the flux return casings and the valve seats. This further reduces the magnetic field established in the armature.

A coil assembly is needed that fits snuggly about the valve cartridge armature and that encounters minimal axial translation resulting from manufacturing tolerances to maximize the magnetic flux through the valve armature.

SUMMARY OF THE INVENTION

The present invention is directed towards a coil assembly that meets the foregoing needs. The coil assembly comprises a coil wound upon a bobbin. A pair of terminals is supported by the bobbin. The coil has a pair of lead wires, each of which is connected to one of the terminals. Each terminal is adapted to be coupled to an electronic control unit. The coil is enclosed at least in part by a flux return casing. At least one resilient member is arranged and configured to urge the bobbin and the casing axially downward.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
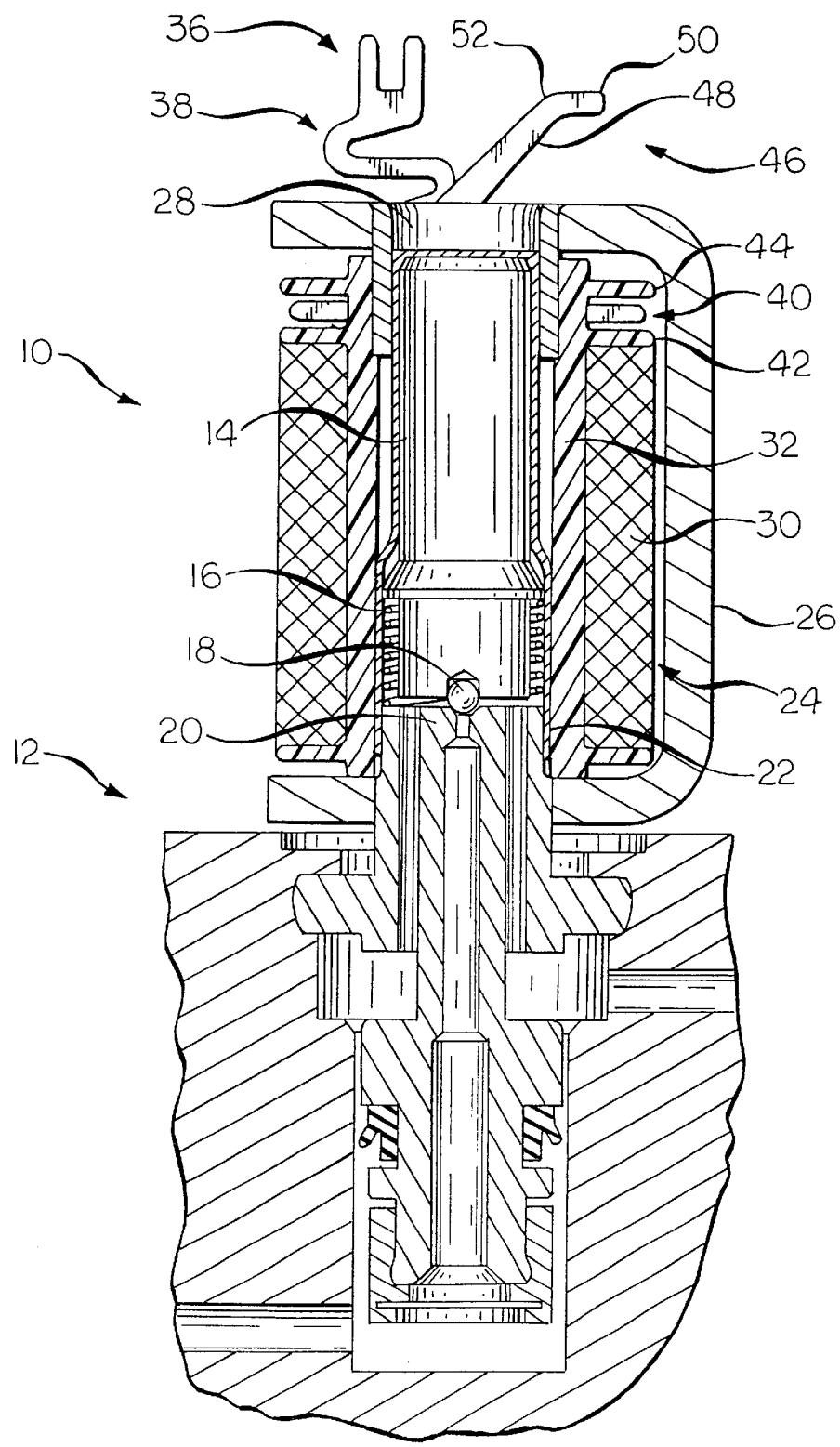
FIG. 1 is a side elevational view of a self-locating coil assembly according to the invention carried by a solenoid valve that is supported by a valve body.

Referring now to FIG. 1, there is shown a sectional view of a solenoid valve 10 mounted upon a valve body 12. The valve 10 includes an axially shiftable armature 14, which is biased in an upward direction by a biasing element, such as the spring 16 shown. The spring 16 maintains a valve ball 18 in a normally opened position. Alternatively, a biasing element may be provided to maintain the valve ball 18 in a normally opened position. The valve ball 18 is adapted to cooperate with a valve seat member 20, which is provided in the valve body 12. The armature 14 is adapted to slide within a valve sleeve 22.

Figure 4:
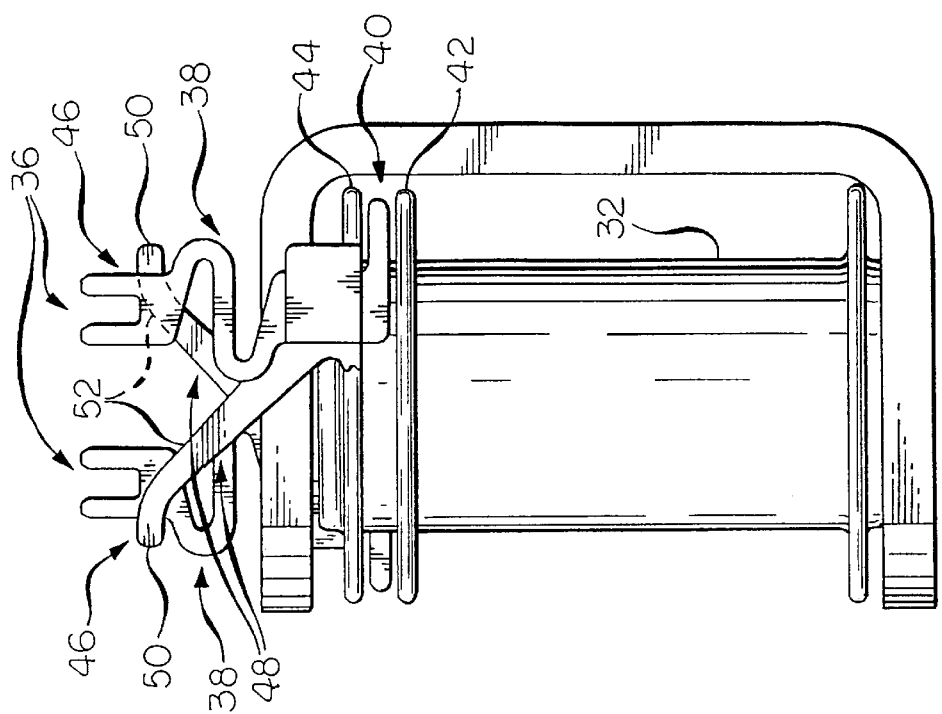
FIG. 4 is a side elevational view of the coil assembly shown in FIGS. 1–3.

A coil assembly is carried by the valve sleeve 22. The coil assembly includes a solenoid coil 24. The coil 24 may be comprised of a coil winding 30. As best seen in FIG. 4, the coil winding 30 is formed from multiple turns 80 of an insulated magnet wire having a round cross section, such as #28½ magnet wire. The coil wire is preferably a helical coil, as shown in FIG. 4, wound upon a bobbin 32. The bobbin 32 is formed of a non-conductive material. The bobbin 32 supports a pair of terminal supports 34. Each of the supports 34 is adapted to support a terminal 36. A lead wire 82 of the coil 30 is wound around a lower end 84 of each of the terminals 36 and soldered thereto. Any remaining portion of the lead wires 82 may be tucked into a channel 40 bounded between two vertically spaced flanges 42, 44 at the upper end of the bobbin 32. An upper end 86 of each terminal 36 may be coupled to an electrical control unit 88, such as by a lead frame or multi-chip Module 90.

The lead frame or multi-chip module may support a plurality of coils for controlling a plurality of valves in a hydraulic control unit. The lead frame or multi-chip module would include a pair of holes for receiving each pair of terminals. In a preferred embodiment of the invention, the terminals 36 are compliant to enable the coil assembly to be positioned relative to a corresponding valve. The particular terminals 36 illustrated include an intermediate portion 38 that is extendable, retractable, and laterally displaceable. This is accomplished by providing segments of the intermediate portion 38 that bend and overlap. Although other configurations are conceivable, the segments bend and overlap to form a substantially S-shaped configuration that is extendable, retractable, and laterally displaceable.

The coil 24 is enclosed at least in part by a metal flux return casing 26. An annular flux ring 28 is disposed within an opening at the upper end of the bobbin 12. The flux ring 28 is adapted to engage the flux return casing 26. The flux ring 28 and the flux return casing 26 may be of unitary construction. The flux return casing 26 and flux ring 28 complete a magnetic flux path that passes through the armature 14 and the valve seat member 20.

To actuate the valve 10, electric current is supplied through the terminals 36 to the coil 24. The current establishes a magnetic field in the armature 14, which pulls the armature 14 in a downward direction, closing the valve ball 18. An interruption in the current causes the magnetic field to collapse. This allows the spring 16 to return the armature 14 to its original position, thereby reopening the valve ball 18. Other solenoid valves, such as normally closed solenoid valves, may have structures similar to the normally open valve 10 described above.

Figure 2:
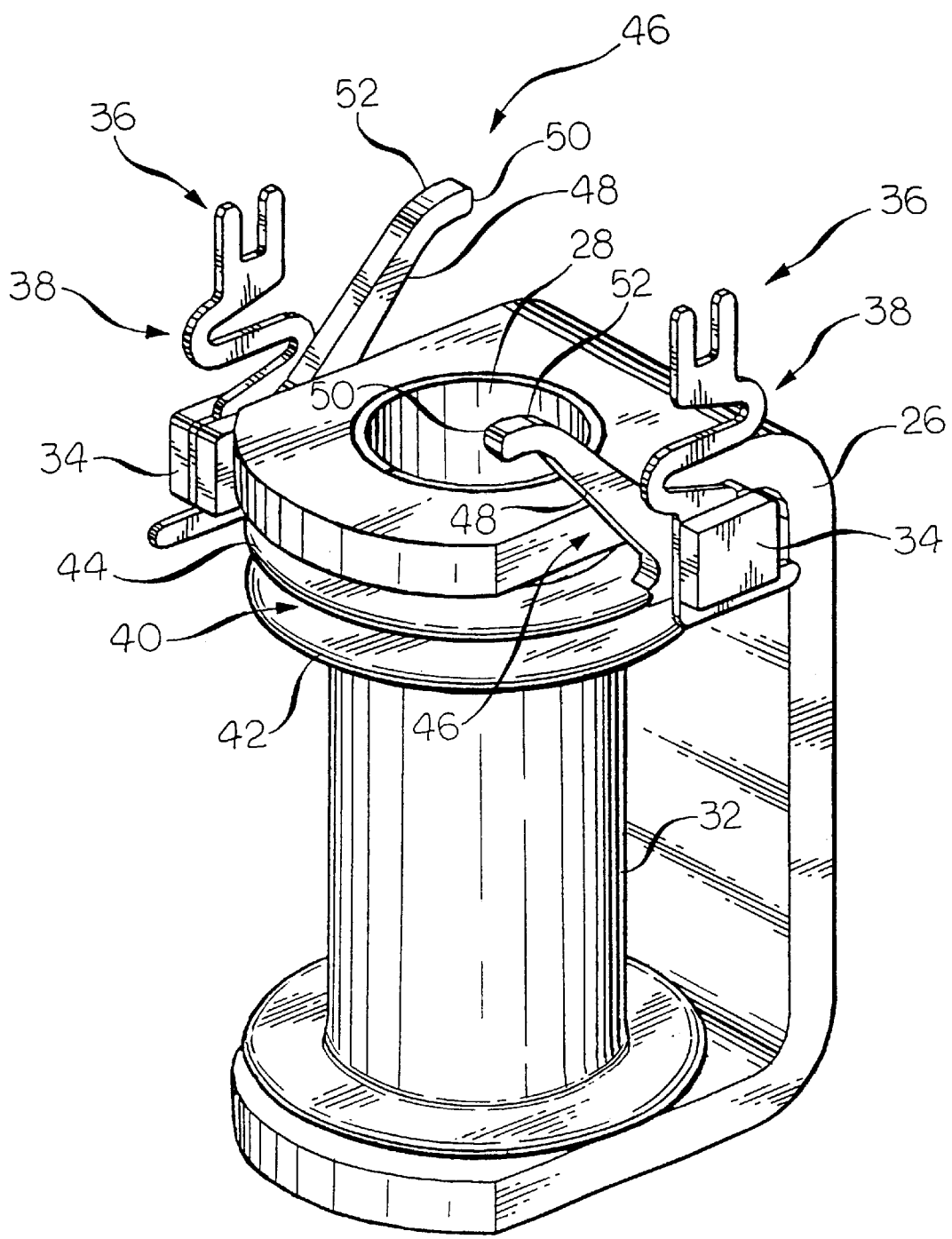
FIG. 2 is a perspective view of the coil assembly shown in FIG. 1.
Figure 3:
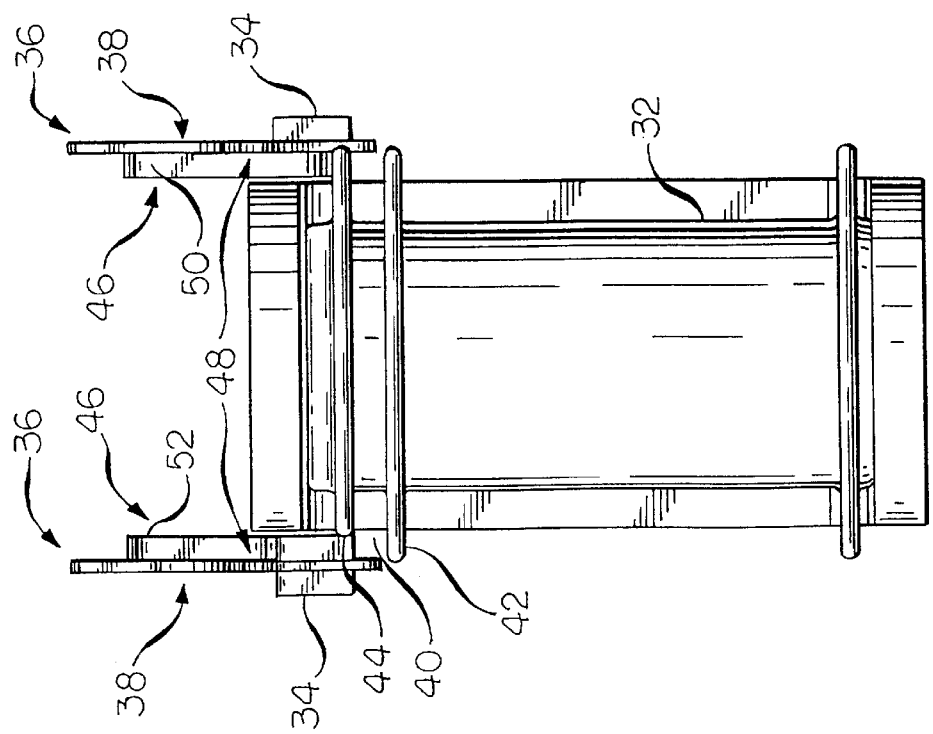
FIG. 3 is a front elevational view of the coil assembly shown in FIGS. 1 and 2.

In accordance with a preferred embodiment of the present invention, the bobbin 32 is provided with a resilient member, such as a spring, that minimizes axial translation of the bobbin 32. As illustrated in FIGS. 2–4, a pair of springs 46 is supported by the upper end of the bobbin 32. The springs 46 are supported in spaced relation to one another by an uppermost flange 42. Each spring 46 is in the form of an elongate resilient member extending in an upward direction from the uppermost flange 42. A lower end of each spring 46 is preferably molded to the upper flange 44. An intermediate portion 48 of each spring 46 is disposed at an angle between 0 and 90 degrees relative to the uppermost flange 42. An upper end of each spring 46 may be bent to form a substantially horizontally extending portion. The horizontally extending portion defines a contact member 50 that is adapted to engage the lead frame or multi-chip module upon coupling the terminals 36 to the lead frame or multi-chip module. A curved region 52 of each spring 46 provides a smooth transition between the intermediate portion 48 and the contact member 50.

Upon compressing the springs 46, the lead frame or multi-chip module may smoothly traverse the curved region 52. The compressed springs 46 urge the bobbin 32 axially downward along the valve armature 14 and cause the metal flux return casing 26 to contact the valve seat member 20 to complete a magnetic flux return path that is adapted to pass through the armature 14 and the valve seat member 20. The magnetic flux path must be sufficient to pull the armature 14 against the force of the spring 46 to open or close the valve ball 18.

Figure 5:
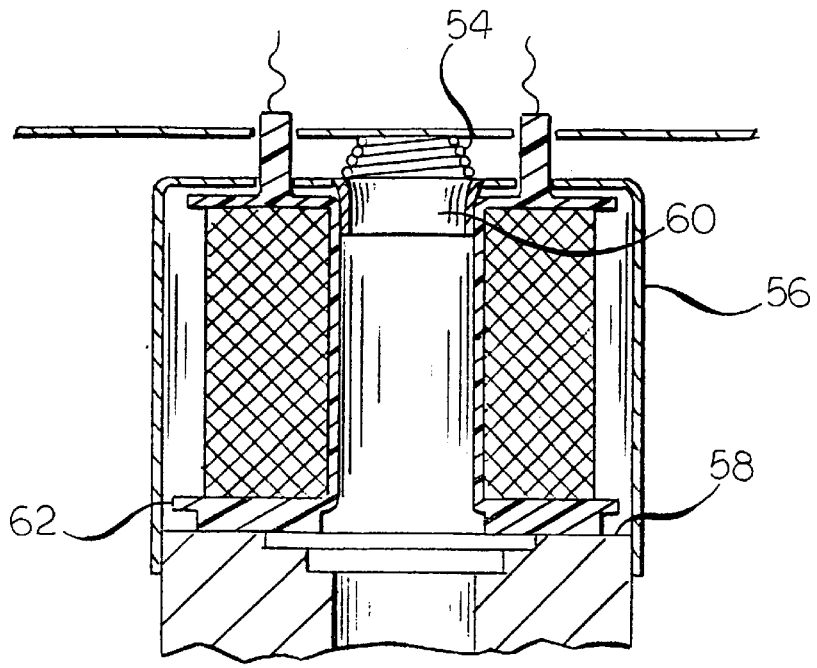
FIG. 5 is a side elevational view of an alternative coil assembly.

An alternative embodiment of the invention is illustrated in FIG. 5. According to this embodiment, a single helical spring 54 is supported by the upper end of a flux return casing 56. The spring 54 is adapted to be compressed between the casing 56 and the lead frame or multi-chip module. When compressed, the spring 54 urges the coil assembly axially downward. The casing 56 is urged into contact with the valve seat member 58 and the flux ring 60 in the opening at the upper end of the bobbin 62. Similar to the springs 46 of the foregoing embodiment, the spring 54 of this embodiment functions to position or locate the coil assembly.

Figure 6:
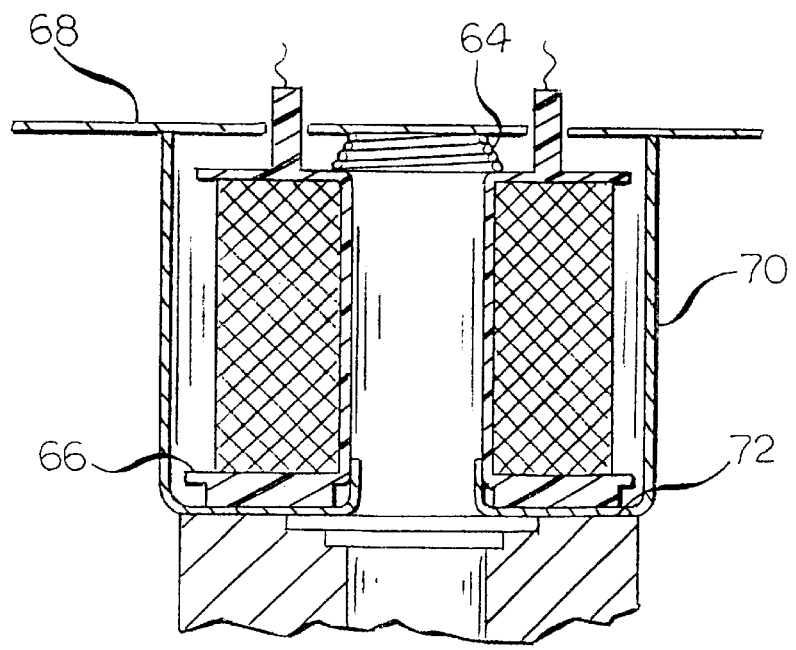
FIG. 6 is a side elevational view of yet another coil assembly.

Yet another embodiment of the invention is illustrated in FIG. 6. This embodiment includes a metal helical spring 64. The spring 64 is dimensioned to receive the armature (not shown) and adapted to be compressed between the bobbin 66 and a metal plate 68. The plate 68 is adapted to engage a metal flux return casing 70. The flux return casing 70, the spring 64, and the plate 68 complete a magnetic flux path that passes through the armature (not shown) and the valve seat member 72. The spring 64 according to this embodiment of the invention functions to position the coil assembly and complete the magnetic flux path.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A coil assembly comprising:

a bobbin having an open end;

coil wound upon said bobbin, said coil including a pair of lead wires;

a pair of compliant electrical connectors carried by said bobbin, each of said electrical connectors being electrically connected to one of said coil lead wires, said electrical connectors being adapted to electrically couple said coil lead wires to an electronic control unit;

a flux return casing at least partially enclosing said coil; and at least one elongate resilient member molded upon an end of said bobbin, said resilient member configured to urge said bobbin and said flux return casing in an axial direction.

2. The coil assembly of claim 1, further comprising:

an annular flux ring disposed within said open end of said bobbin, said flux ring being adapted to engage said flux return casing, said flux return casing and said flux ring completing a magnetic flux path that includes an armature and a valve seat member of a valve cartridge.

3. The coil assembly of claim 1, wherein said coil is comprised of a magnet wire having a round cross-section.

4. The coil assembly of claim 3, wherein said magnet wire is wound as a helical coil upon said bobbin.

5. The coil assembly of claim 1, wherein said bobbin is formed of a non-conductive material.

6. The coil assembly of claim 1, wherein said compliant electrical connectors include a pair of flexible coil lead wires and further wherein said bobbin supports a pair of terminal supports, each one of said terminal supports being adapted to support one of said coil lead wires.

7. The coil assembly of claim 2, wherein said coil includes a pair of lead wires and further wherein said bobbin supports a pair of terminals, each of said lead wires being connected to one of said terminals, each of said terminals being adapted to be coupled to the electronic control unit by a lead frame or multi-chip module.

8. The coil assembly of claim 7, wherein said bobbin includes two axially spaced flanges bounding a channel, said channel being adapted to receive said lead wires.

9. The coil assembly of claim 7, wherein said terminals are compliant.

10. The coil assembly of claim 9, wherein said terminals include an intermediate portion that is extendable, retractable, and laterally displaceable.

11. The coil assembly of claim 10, wherein said intermediate portion of each said terminal is comprised of segments that bend and overlap.

12. The coil assembly of claim 11, wherein said terminal segments bend and overlap to form a substantially S-shaped configuration.

13. The coil assembly of claim 1, wherein said resilient member is supported by an end of said bobbin.

14. The coil assembly of claim 1, wherein said resilient member is supported by an end of said flux return casing so that said resilient member is adapted to be compressed between said flux return casing and a lead frame or multi-chip module to urge said flux return casing into contact with a valve seat member.

15. The coil assembly of claim 14, wherein said flux ring is urged into an open end of said bobbin.

16. The coil assembly of claim 14, wherein said flux ring and said flux casing are of unitary construction.

17. The coil assembly of claim 13, wherein said resilient member is one of a pair of resilient members, each said resilient member forming a spring supported by an end of said bobbin.

18. A coil assembly comprising:

a bobbin having an open end;

a coil wound upon said bobbin, said coil including a pair of lead wires;

a pair of compliant electrical connectors carried by said bobbin, each of said electrical connectors being electrically connected to one of said coil lead wires, said electrical connectors being adapted to electrically couple said coil lead wires to an electronic control unit;

a flux return casing at least partially enclosing said coil; and a pair of resilient members supported by an end of said bobbin, each of said resilient members forming a spring supported by said end of said bobbin and urging said bobbin and said casing in an axial direction, each said resilient member further having a first end molded to a flange formed upon an end of said bobbin, an intermediate portion extending away from said bobbin flange at an angle relative to an axis of said bobbin, each of said resilient members also having a second end that is opposite from said first end, said second end forming an angle with said intermediate portion to form a contact member that is parallel to a surface of said bobbin flange, and a curved region between said intermediate portion and said contact member.

19. The coil assembly of claim 1, wherein said resilient member is a helical spring supported by an upper end of said flux return casing, said spring being adapted to be compressed between said casing and a lead frame or multi-chip module and urge said bobbin and said flux return casing downward into contact with a valve seat member and said flux ring into an open end of said bobbin.

20. The coil assembly of claim 1, wherein said resilient member is a helical spring dimensioned to receive a valve armature and adapted to be compressed between said bobbin and a metal plate, said plate being adapted to engage said flux return casing, said flux return casing, said spring, and said plate completing a magnetic flux path that passes through the armature and the valve seat member.

* * * * *